United States Patent Office 3,527,839
Patented Sept. 8, 1970

3,527,839
ETHYLENE OLIGOMERIZATION
Peter W. Glockner, Alameda, and Kenneth W. Barnett, San Leandro, Calif., assignors to Shell Oil Company, New York, N.Y., a corporation of Delaware
No Drawing. Filed Jan. 13, 1969, Ser. No. 790,841
Int. Cl. C07c 3/20
U.S. Cl. 260—683.15      7 Claims

ABSTRACT OF THE DISCLOSURE

Ethylene is oligomerized to a product mixture consisting predominanately of linear alpha-olefins in the presence of a sulfided, supported nickel oxide catalyst.

BACKGROUND OF THE INVENTION

A variety of oligomerization catalysts have been utilized to convert, i.e., oligomerize, ethylene into olefinic products of higher molecular weight, e.g., to dimer, trimer, tetramer or the like. However, the character and relative proportions of the product mixture are greatly dependent upon the particular catalyst employed. One process is that of Bailey et al., U.S. 2,381,198 and U.S. 2,581,228, issued Aug. 7, 1945 and Jan. 1, 1952 respectively, which employs a supported nickel oxide catalyst. This catalyst composition produces a product mixture consisting of dimeric products as well as olefinic products in the higher molecular weight range, e.g., trimer and tetramer products. It would be of advantage, however, to obtain a product mixture of equivalent or higher proportion of desirable olefinic products in the higher molecular range, which are advantageously linear in character.

SUMMARY OF THE INVENTION

It has now been found that an improved process of oligomerizing ethylene is obtained through the use of sulfided, supported nickel oxide as catalyst. The process is characterized by an ethylene conversion to a product mixture of relatively high proportion of higher olefinic products which are highly linear in character and predominately alpha-olefins.

DESCRIPTION OF PREFERRED EMBODIMENTS

Catalyst composition comprises a supported nickel oxide composition which has been sulfided with sulfur or a sulfur-containing compound as described below.

The support material comprises a normally solid inorganic oxide support, preferably consisting essentially of one or more metal oxides, which contain a major proportion of at least one metal oxide component selected from silica and alumina. Such materials are commonly known as refractory oxides and include synthetic materials as well as acid-treated clays or the crystalline reticular aluminosilicates known in the art as molecular sieves. Synthetic refractory oxides are preferred over naturally occurring materials or molecular sieves and exemplary refractory oxides include silica, alumina, silica-alumina, silica-magnesia, tungsten oxide-silica, tungsten oxide-alumina, boria-alumina, silica-alumina-zirconia, molybdenum oxide-silica-alumina and silica-titania-zirconia. Preferred refractory oxide supports are siliceous refractory oxides containing silica as the major component, and particularly preferred as the siliceous refractory oxide is silica-alumina containing up to about 30% by weight of alumina, preferably from about 5% to 25% by weight of alumina. The supported nickel oxide composition is prepared by any conventional method. In one modification, the supported nickel oxide is prepared by impregnation of a selected support, such as silica-alumina, with a nickel salt, such as nickel nitrate, subsequently drying the impregnated support, and then heating the same to a temperature in the range of about 300° C. to about 700° C. to convert the nickel salt to the oxide. This modification is disclosed in U.S. 2,381,198, U.S. 2,581,228 and U.S. 2,904,608, and the disclosures of these patents are herewith incorporated by reference. In another modification, the supported nickel oxide is prepared by coprecipitating the hydrous oxides of silicon and/or other metals, such as aluminum, with a nickel salt, and converting the nickel component to nickel oxide by heating in a non-reducing atmosphere at a temperature in the range of 300° C. to 700° C. This modification, frequently known as "gelation" and "cogelation" is disclosed in U.S. 2,921,971 and the disclosure of this patent is herewith incorporated by reference. The supported nickel oxide composition ordinarily contains from about 0.1% to about 20% by weight of nickel oxide based on support, although amounts from about 3% to about 10% by weight of nickel oxide on the same basis is preferred.

It is essential to sulfide the supported nickel oxide composition with sulfur or a sulfur-containing compound in order to obtain the improved catalyst composition of the invention. In general, any sulfur-containing compound, in addition to sulfur, can be employed as the sulfiding agent. One class of suitable sulfur compounds are those which contain only the atoms of hydrogen and carbon in addition to atoms of sulfur, e.g., hydrogen sulfide and hydrocarbyl sulfur compounds. Exemplary hydrocarbyl sulfur compounds are olefin episulfides, dialkyl sulfides and disulfides of up to 10 carbon atoms. Illustrative olefin episulfides are alkene episulfides, e.g., propylene episulfide, 1-butene episulfide, 2-butene episulfide, 1-decene episulfide and 2-decene episulfide, and cycloalkene episulfide, e.g., cyclopentene episulfide, cyclohexene episulfide, cyclooctene episulfide and cyclodecene episulfide. Illustrative dialkyl sulfides are dimethyl sulfide, methyl ethyl sulfide, diethyl sulfide, ethyl butyl sulfide and dibutyl sulfide. Illustrative dialkyl disulfides are dimethyl disulfide, diethyl disulfide, propyl butyl sulfide and ethyl octyl sulfide.

Other suitable hydrocarbyl sulfur compounds are aliphatic mercaptans, e.g., ethyl mercaptan, propyl mercaptan and cyclohexyl mercaptan; alkyl dithiocarboxylic acids, e.g., thionothiolacetic acid, thionothiolpropionic acid and thionothiolbutyric acid; and aliphatic thioketones, e.g., propan-2-thione, butan-2-thione, pentan-3-thione, 2,4-pentanedithione and cyclohexanethione.

Preferred sulfiding agents are aliphatic sulfur compounds containing a high proportion of sulfur, particularly lower (up to 4 carbon atoms) olefin episulfides, dialkyl sulfides and dialkyl sulfides.

The sulfiding treatment of the supported nickel oxide composition can be conducted by any more or less conventional method provided the supported nickel oxide composition is contacted with sufficient sulfiding agent to incorporate from about 0.01% to about 5% by weight of sulfur based on support preferably 0.1% to about 3% by weight of sulfur on the same basis, with the proviso that the weight ratio of elemental nickel to sulfur is at least 3:1, preferably at least 5:1 which weight ratios of elemental nickel to sulfur are equivalent to weight ratios of nickel oxide to sulfur of 3.81:1 and 6.35:1, respectively. No special treatment of the supported nickel oxide prior to contact with the sulfiding agent is required. In some instances, however, it is useful to partially reduce the supported nickel oxide, for example, as by treatment with hydrogen prior to contact with the supporting agent. In one modification, the sulfided nickel oxide composition is prepared by contacting the supported nickel oxide with a solution of the sulfiding agent in a substantially inert liquid diluent. Illustrative of suitable diluents are hydrocarbons free from aliphatic unsaturation such as hexane, octane, decane, dodecane, cyclohexane, decahydronophthalene, benzene, toluene and xylene. The supported nickel oxide, sulfiding agent and diluent are contacted at any conveniet temperature with the range from about 20° C. to about 150° C. being satisfactory. The pressure to be employed is not critical. Pressures from about 1 atmosphere to about 50 atmospheres are satisfactory.

Subsequent to the contacting of the supported nickel oxide and the sulfiding agent, the resulting sulfided nickel oxide composition is separated from the diluent phase by conventional techniques such as filtration and decantation.

*The reaction conditions.*—The ethylene oligomerization process is conducted by contacting, in non-gaseous phase, the ethylene, the sulfided nickel oxide composition and a reaction diluent which is the same or is similar to the diluent utilized in the production of the sulfided nickel oxide composition. In certain modifications of the process, a portion of the oligomer product suitably serves as at least a portion of the reaction diluent and less added diluent is required. In most instances, however, added diluent is used and amounts up to 5 moles of diluent per mole of ethylene are satisfactory. The ethylene oligomerization is conducted in an inert reaction environment so that the reaction conditions are substantially anhydrous and substantially oxygen-free.

The amount of sulfided catalyst composition employed in the oligomerization process is not critical. Generally, amounts of catalyst composition of about 1% by weight to about 200% by weight based on ethylene are satisfactory with amounts from about 10% by weight to about 100% by weight on the same basis being preferred.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene feed in liquid-phase solution in the reaction diluent through a reaction zone in which the catalyst composition is maintained. In yet another modification, the sulfided catalyst composition is prepared "in situ" during the oligomerization process by charging ethylene, the supported nickel oxide, the amount of sulfiding agent required to incorporate sufficient sulfur into the catalyst composition and the diluent to an autoclave and maintaining the reaction mixture at reaction temperature and pressure. By any modification, the oligomerization process is conducted at moderate temperatures and pressures. Suitable reaction temperatures vary from about 50° C. to about 250° C., but preferably from about 100° C. to about 200° C. The reaction is conducted at or above atmospheric pressure. The precise pressure is not critical, so long as the reaction mixture is maintained substantially in a non-gaseous phase. Typical pressures vary from about 1 atmosphere to about 80 atmospheres with the range from about 2 atmospheres to about 35 atmospheres being preferred.

The oligomeric products are separated and recovered from the reaction mixture by conventional methods such as fractional distillation, selective extraction adsorption and the like. The reaction diluent and any unreacted ethylene are recycled for further utilization.

The ethylene oligomer products are materials of established utility and many are chemicals of commerce. The oligomer products, which remain ethylenic in character, are converted by conventional catalysts to the corresponding alcohols. Alternatively, the product olefins are converted to secondary and tertiary alcohols as by sulfuric acid-catalyzed hydration. The $C_{12}$–$C_{20}$ alcohols thereby produced are ethoxylated as by reaction with ethylene oxide in the presence of a basic catalyst, e.g., sodium hydroxide, to form conventional detergents and the low molecular weight alcohols are esterified by reaction with polybasic acids, e.g., phthalic acid, to form plasticizers for polyvinyl chloride. The linear $C_{14}$–$C_{18}$ alpha-olefin products are particularly advantageously employed for conversion, e.g., as by treatment with sulfur trioxide, to alpha olefin sulfonates, which are useful as biodegradable detergents.

To further illustrate the improved process of the invention and the novel catalyst composition therefor, the following examples are provided. It should be understood that the details thereof are not to be regarded as limitations as they may be carried as will be understood by one skilled in this art.

EXAMPLE I (A) A supported nickel oxide composition was prepared by impregnating 30 g. of silica-alumina (25% alumina, specific surface area of about 200 m.²/g.) with 6 g. of nickel nitrate in 27 ml. of water at a temperature of 25° C. The impregnated silica-alumina was dried and calcined in air at a temperature of 525° C. for 4 hours. The resulting supported nickel oxide composition contained 3.6% by weight of elemental nickel based on silica-alumina support.

(B) By a similar procedure, a nickel oxide/silica-alumina composition containing 10% by weight of nickel based on silica-alumina support was prepared.

EXAMPLE II (A) A sulfided nickel oxide/silica-alumina catalyst composition was prepared by contacting 10 g. of the supported nickel oxide composition of Example IA with 0.1 g. of dimethyl disulfide in 30 ml. of n-heptane at a temperature of 50° C. for about 5 hours. The resulting composition was filtered, washed with n-heptane and dried under vacuum at a temperature of 25° C. Elemental analysis showed that the resulting catalyst composition was sulfided with 0.29% by weight of elemental sulfur based on silica-alumina support.

(B) By a procedure similar to that of Example IIA, the supported nickel oxide composition of Example IB was sulfided with dimethyl disulfide to give a sulfided nickel oxide containing 2% by weight of sulfur based on silica-alumina support.

EXAMPLE III

The oligomerization of ethylene was conducted in a series of experiments by charging to a reactor 50 g. of ethylene, 60 ml. of heptane and 5 g. of catalyst. The results and reaction conditions are shown in the following table, wherein Run A employed the nickel oxide composition of Example IA, Run B employed the sulfided nickel oxide composition of Example IIA and Run C employed the sulfided nickel oxide composition of Example IIB.

TABLE

| Run | A | B | C |
|---|---|---|---|
| Catalyst composition: | | | |
| Percent wt. nickel | 3.6 | 3.6 | 10 |
| Percent wt. sulfur | 0 | 0.29 | 2 |
| Conditions: | | | |
| Temperature, °C | 150 | 150 | 150 |
| Time, hr | 3 | 3 | 3 |
| Pressure, p.s.i.g. | 400 | 400 | 400 |
| Grams of oligomer/gram of catalyst/hour | 3.2 | 1.9 | 2.1 |
| Selectivity, percent wt.: | | | |
| $C_4$ | 85.4 | 42.7 | 57.4 |
| $C_6$ | 9.6 | 28.2 | 23.0 |
| $C_8$ | 2.3 | 12.6 | 9.0 |
| $C_{10}$ | 1.1 | 7.0 | 3.5 |
| $C_{12}$ | 0.6 | 4.0 | 3.0 |
| $C_{14}$ | 0.5 | 2.8 | 2.1 |
| $C_{16}$ | 0.3 | 1.3 | 1.5 |
| $C_{18}$ | 0.2 | 0.8 | 0.5 |
| $C_{20}$ | | 0.6 | |
| Linearity of oligomer product: | | | |
| $C_4$ | 100 | 100 | 100 |
| $C_6$ | 81 | 87 | 80 |
| $C_8$ | 32 | 80 | 65 |
| $C_{10}$ | 4 | 72 | 50 |
| $C_{12}$ | 1 | 78 | 72 |
| $C_{14}$ | 0 | 82 | 91 |
| $C_{16}$ | 0 | 88 | 90 |
| $C_{18}$ | 0 | 89 | 95 |
| $C_{20}$ | | 90 | |

We claim as our invention:

1. The process of oligomerizing ethylene by contacting ethylene in an inert liquid diluent at a temperature of from about 50° C. to about 250° C. in the presence of an inorganic oxide catalyst support containing from about 0.01% by weight to about 5% by weight of sulfur and from about 0.1% by weight to about 20% by weight based on catalyst support of nickel oxide, with the proviso that the weight ratio of nickel oxide to sulfur is at least 3.81:1.

2. The process of claim 1 wherein the catalyst support is a siliceous refractory oxide.

3. The process of claim 2 wherein the sulfur is incorporated on the catalyst support in amounts from about 0.1% by weight to about 3% by weight based on support by contacting the catalyst support containing the nickel oxide with elemental sulfur or a sulfur compound containing only the atoms of carbon, hydrogen and sulfur, in an inert liquid reaction diluent.

4. The process of claim 3 wherein the weight ratio of nickel oxide to sulfur is at least 6.35:1.

5. The process of claim 4 wherein the sulfur compound is selected from the group consisting of olefin episulfides, dialkyl disulfides and dialkyl sulfides of up to 10 carbon atoms.

6. The process of claim 5 wherein the sulfur compound is dimethyl disulfide.

7. The process of claim 5 wherein the catalyst support is silica-alumina.

References Cited

UNITED STATES PATENTS

| | | | |
|---|---|---|---|
| 2,511,453 | 6/1950 | Barry | 252—439 X |
| 2,780,584 | 2/1957 | Doumani | 252—439 X |
| 3,113,166 | 12/1963 | Weesner | 260—683.15 |
| 3,161,697 | 12/1964 | Choufoer et al. | 260—683.15 |
| 3,274,122 | 9/1966 | Holmes et al. | 252—439 |
| 3,341,620 | 9/1967 | Clark et al. | 260—683.15 |

PAUL M. COUGHLAN, JR., Primary Examiner

U.S. Cl. X.R.

252—439